United States Patent [19]
Mineo

[11] Patent Number: 5,561,401
[45] Date of Patent: Oct. 1, 1996

[54] QUADRATURE MODULATOR OPERABLE IN QUASI-MICROWAVE BAND OF DIGITAL COMMUNICATION SYSTEM

[75] Inventor: Masaho Mineo, Tokyo, Japan

[73] Assignee: NEC Corporation, Tokyo, Japan

[21] Appl. No.: 413,466

[22] Filed: Mar. 28, 1995

[30] Foreign Application Priority Data

Mar. 28, 1994 [JP] Japan .................................. 6-082292

[51] Int. Cl.$^6$ .............................. H03C 1/00; H03C 3/00
[52] U.S. Cl. ........................ 332/103; 332/163; 333/117; 361/790; 455/111
[58] Field of Search .................. 332/103–105, 332/163–166; 375/279–284, 298, 308; 327/238, 254, 255; 331/45, 42; 455/111; 361/735, 790; 257/258–260; 333/100, 117–123, 128, 136

[56] References Cited

U.S. PATENT DOCUMENTS

| | | | |
|---|---|---|---|
| 3,273,079 | 9/1966 | Curtis ........................................ | 333/119 |
| 3,731,217 | 5/1973 | Gerst et al. ............................. | 333/117 X |
| 5,001,492 | 3/1991 | Shapiro et al. ........................ | 333/117 X |
| 5,172,077 | 12/1992 | Funada ............................ | 331/107 SLX |
| 5,227,739 | 7/1993 | Mandai et al. .................. | 331/107 SLX |
| 5,382,925 | 1/1995 | Hayashi et al. ...................... | 333/118 X |

FOREIGN PATENT DOCUMENTS

| | | |
|---|---|---|
| 61-238144 | 10/1986 | Japan . |
| 2174343 | 7/1990 | Japan . |
| 4287542 | 10/1992 | Japan . |
| 5347529 | 12/1993 | Japan . |

OTHER PUBLICATIONS

G. Flower et al., "QPSK Modulators for Digital Cellular Communication", *IEEE 1992 Bipolar Circuits and Technology Meeting* 3.2, Jul. 10, 1992, pp. 59–62.

P. Weger et al., "Digital Phase–Shift Quadrature Frontend For Lo–Inputs Up to 6 GHz", *Proceedings of 20th European Microwave Conference*, Sep. 1990, pp. 424–428.

K. Yamamoto et al., "A 1.9–GHz–Band GaAs Direct–Quadrature Modulator IC with a Phase Shifter", *IEEE Journal of Solid State Circuits*, vol. 28, No. 10, Oct. 1993, pp. 994–1000.

*Primary Examiner*—David Mis
*Attorney, Agent, or Firm*—Sughrue, Mion, Zinn, Macpeak & Seas

[57] ABSTRACT

The present invention has an object to provide a compact quadrature modulator manufactured at low cost in such a manner that an input level is low over a wide high frequency band, and few input signals are wrapped around an output terminal. The quadrature modulator is mainly constructed of a multi-layer substrate into which a 90-degree phase shifter is assembled, a semiconductor integrated modulator circuit into which two sets of 2-phase modulators and an output signal in-phase synthesizing circuit, and a lid. The multi-layer substrate is constructed of "n" pieces of layers in total, namely from a first substrate corresponding to an uppermost layer to an n-th substrate corresponding to a lowermost layer. The first substrate layer is a layer for assembling a semiconductor integrated circuit, or a layer for connecting a substrate with a semiconductor integrated circuit. The 90-degree phase shifter is constituted by distributed coupling circuits having wavelengths of $\lambda g/4$ by both of wiring patterns formed on the substrates corresponding to an intermediate layer of the multi-layer substrate. A wiring pattern connected to a ground terminal and other circuit components are formed on the n-th substrate layer, i.e., the lowermost layer.

6 Claims, 12 Drawing Sheets

QUADRATURE MODULATOR OPERABLE IN QUASI-MICROWAVE BAND OF DIGITAL COMMUNICATION SYSTEM

BACKGROUND OF THE INVENTION

1. Field of the Invention

The present invention generally relates to a quadrature modulator. More specifically, the present invention is directed to a quadrature modulator for a digital communication suitable to a phase modulation of a high frequency signal such as in a quasi-microwave signal band.

2. Description of Prior Art

Conventionally, quadrature modulators used in such a high frequency band as a quasi-microwave band have been constructed by way of semiconductor integrated circuits. For instance, "QPSK Modulators for Digital Cellular Communication" of Bipolar Circuits and Technology Meeting 3.2, IEEE, 1992, pages 59 to 62 describes the quadrature modulator as shown in a circuit diagram of FIG. 1.

Figure 1:
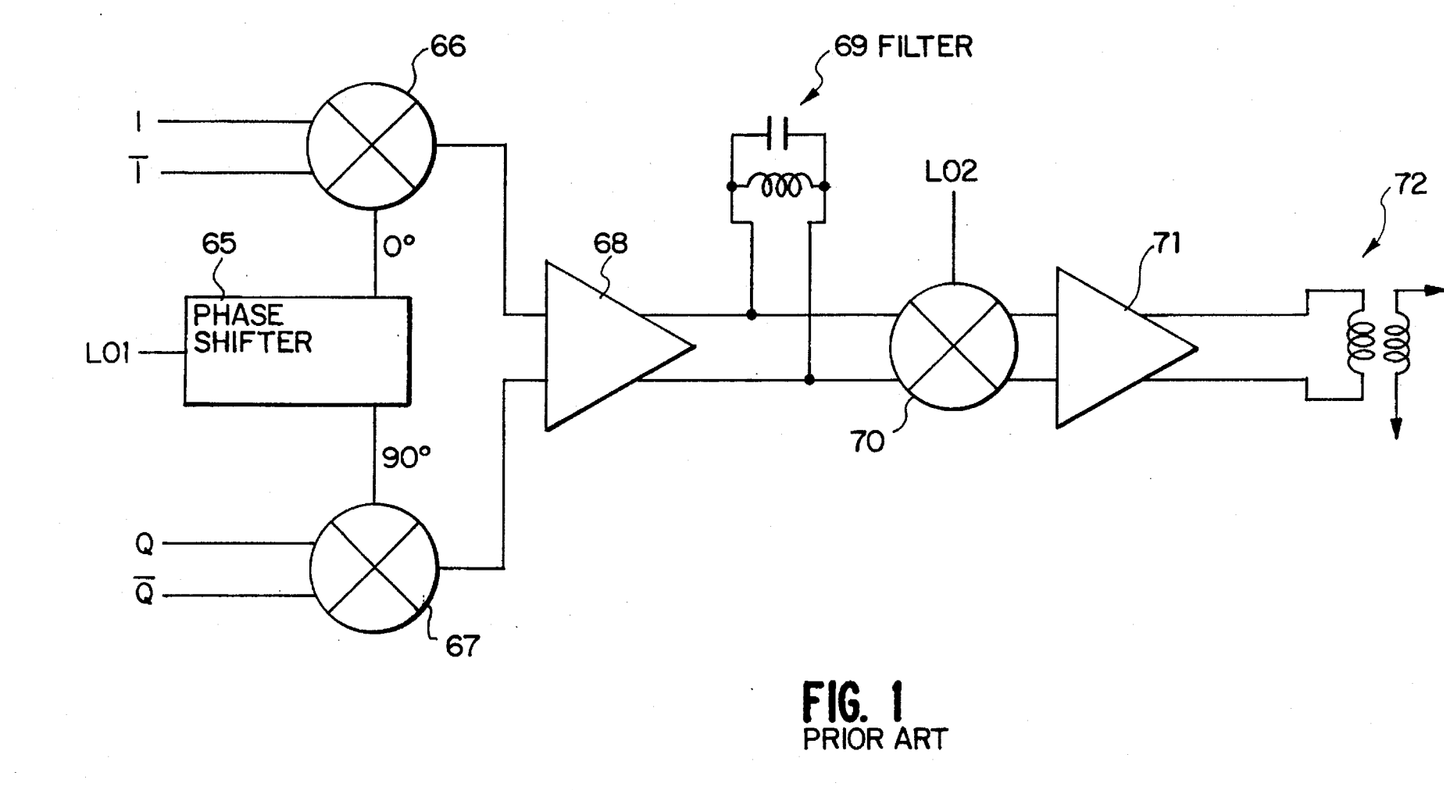
FIG. 1 is a circuit diagram for showing an example of one conventional quadrature modulator.

As represented in FIG. 1, in this prior art quadrature modulator, the QPSK-modulated wave is obtained by phase-shifting the local oscillating signal LO1 by phase shifter 65 to produce a first signal and a second signal having a phase sifted by 90 degrees from that of the first signal. Thereafter, the first signal is supplied to mixer 66 so as to be multiplied with the in-phase signal "I" having the phase opposite to that of this first signal. On the other hand, the second signal is supplied to mixer 67 in order to be multiplied with the quadrature signal "Q" having the phase opposite to that of the second signal. Then, these multiplied output signals are supplied to synthesizing amplifier 68 so as to be synthesized with each other, thereby producing the QPSK modulated wave. After only the required frequency component of this QPSK modulated wave has been filtered out by filter circuit 69 having the bandpass filter characteristic, this filtered frequency component is furnished to mixer 70. In the mixer 70, this filtered frequency component is mixed with another local oscillating signal LO2 to be frequency converted, so that the resultant signal is obtained as the quasi-microwave band signal. Then, further, this quasi-microwave band signal is processed in output amplifier 71 and balance-unbalance converting circuit 72 to be outputted.

Figure 2:
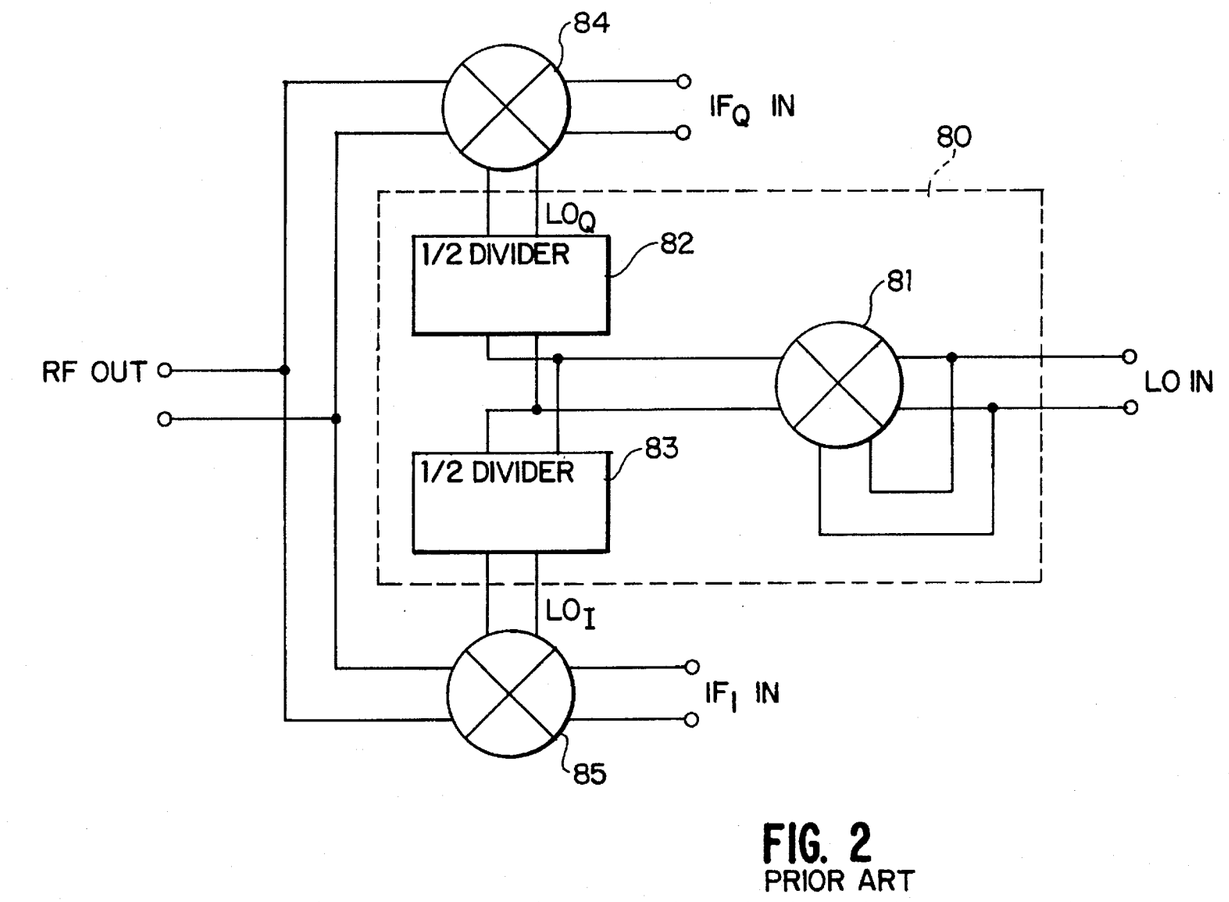
FIG. 2 is a schematic block diagram for representing another conventional quadrature modulator manufactured by the bipolar transistor in the semiconductor integrated circuit form.

Another conventional quadrature modulator, as indicated in a block diagram of FIG. 2, is disclosed in "DIGITAL PHASE-SHIFT QUADRATURE FRONTED FOR LO-INPUTS UP TO 6 GHz" written by P. Weger et. al., Publication of 20th Europe Microwave Conference, 1990, page 426.

As indicated in FIG. 2, 90-degree phase shifter 80 is constructed of mixer 81 and two sets of ½ frequency dividers 82 and 83 in the conventional quadrature modulator. In this quadrature modulator, the input signal is multiplied by the local oscillating signal LO by the mixer 81 to obtain the signals having the phases opposite to each other and the frequencies two times higher than that of the input signal. These output signals are divided by ½ in the frequency dividers 82 and 83, so that such carrier signals $LO_Q$ and $LO_I$ are outputted, which have the phases different from each other by 90 degrees and also the same frequencies as that of the above-described local oscillating signal LO. Mixers 84 and 85 multiply modulating signals $IF_Q$ and $IF_I$ by the carrier signals $LO_Q$ and $LO_I$ to output the multiplied signals RF as the quadrature modulated waves.

In the conventional quadrature modulator shown in FIG. 2, the 90-degree phase shifter 80 is manufactured by the silicon transistors as the semiconductor integrated circuit. On the other hand, other quadrature modulators manufactured by such compound semiconductors as GaAs as an integrated circuit are conventionally known from, for example, "A 1.9-GHz-Band GaAs Direct-Quadrature Modulator IC with a Phase Sifter" by K. Yamamoto et al., "IEEE JOURNAL OF SOLID-STATE CIRCUITS", VOL. 28, No. 10, October 1993, pages 994 to 1000.

Figure 3:
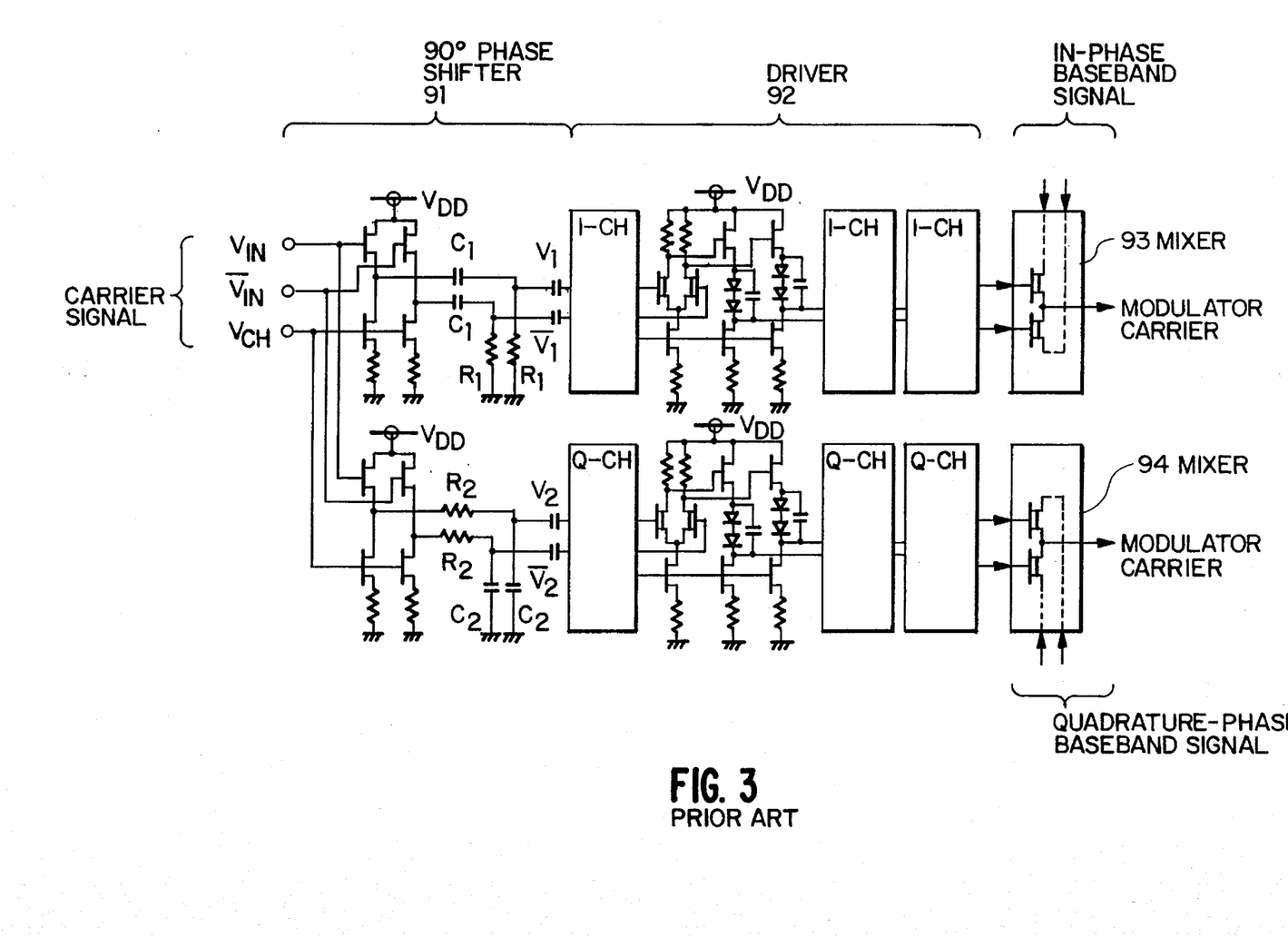
FIG. 3 is a schematic block diagram for indicating another conventional quadrature modulator manufactured by the compound semiconductor in the semiconductor integrated circuit form.

FIG. 3 is a circuit diagram for showing the quadrature modulator manufactured from the compound semiconductor as an IC form, which is disclosed in the above-described publication. This conventional modulator is arranged by 90-degree phase shifter 91, driver 92, and mixers 93 and 94. The driver 92 owns biasing capacitors C1 and C2 at the front stage, and is constructed in such a way that three stages of the differential amplifiers with employment of the field-effect transistor made of GaAs are cascade-connected. The carrier signals having the different phases from each other by 90 degrees are inputted from the 90-degree phase shifter 91 into this driver 92 to be amplified by the driver 92. Then, the amplified carrier signals are supplied to the mixers 93 and 94 in which these amplified carrier signals are multiplied with the modulating signal.

Figure 4:
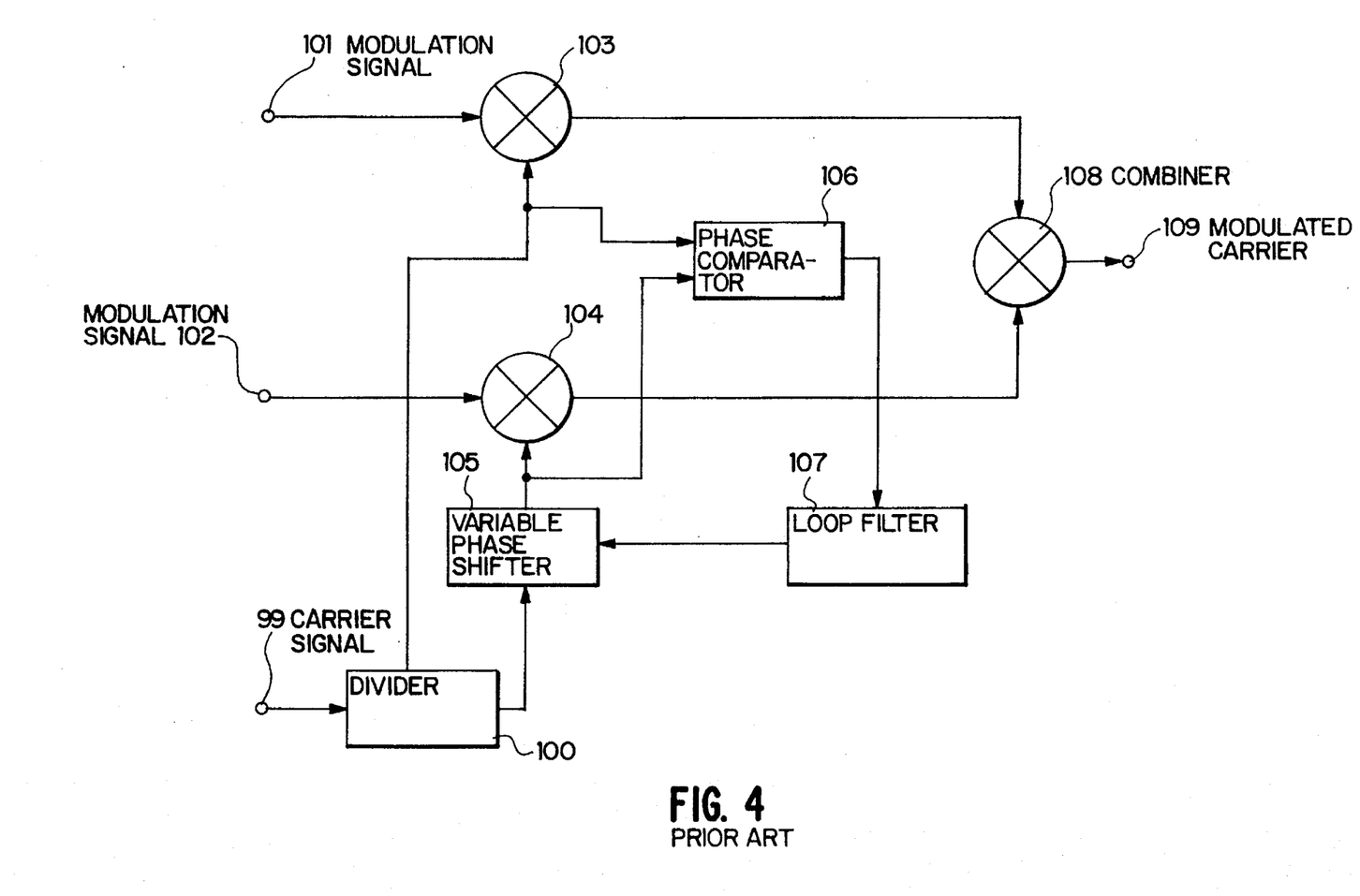
FIG. 4 schematically represents the circuit arrangement of another conventional quadrature modulator having the phase error correcting means.

Also, there have been conventionally proposed the methods for correcting the phase errors of the 90-degree phase shifter in, for instance, Japanese Patent Disclosures No. 61-238144 (1986), No. 2-174343 (1990), and No. 4-287542 (1992). As an example, the circuit block diagram of the quadrature modulator described in Japanese Patent Disclosure No. 2-174343 is indicated in FIG. 4. In accordance with the conventional quadrature modulator shown in FIG. 4, the carrier signal entered from input terminal 99 is divided into two divided carrier signals by divider 100. One divided carrier signal is supplied to mixer 103 so as to be multiplied with the first modulation signal supplied from input signal 101, whereas the other divided carrier signal is phase-shifted by 90 degrees in variable phase shifter 105, and the phase-shifted carrier signal is supplied to mixer 104 so as to be multiplied with the second modulation signal derived from input terminal 102. The respective output signals from the mixers 103 and 104 are combined with each other in combiner 108, and then the combined signal is supplied as the QPSK modulated carrier to output terminal 109.

In addition to the above-described general circuit arrangement, phase comparator 106 of this conventional quadrature modulator compares the phases of these divided carrier signals to detect how degree the phase difference between them is shifted from the original 90 degrees. The signal representative of this detected phase difference is supplied via loop filter 107 to the variable phase shifter 105 as the control signal, so that the phase shift amount of the variable phase shifter 105 is variable-controlled in such a manner that the phase difference between the output signals from the mixers 103 and 104 can be equal to 90 degrees.

Figure 5:
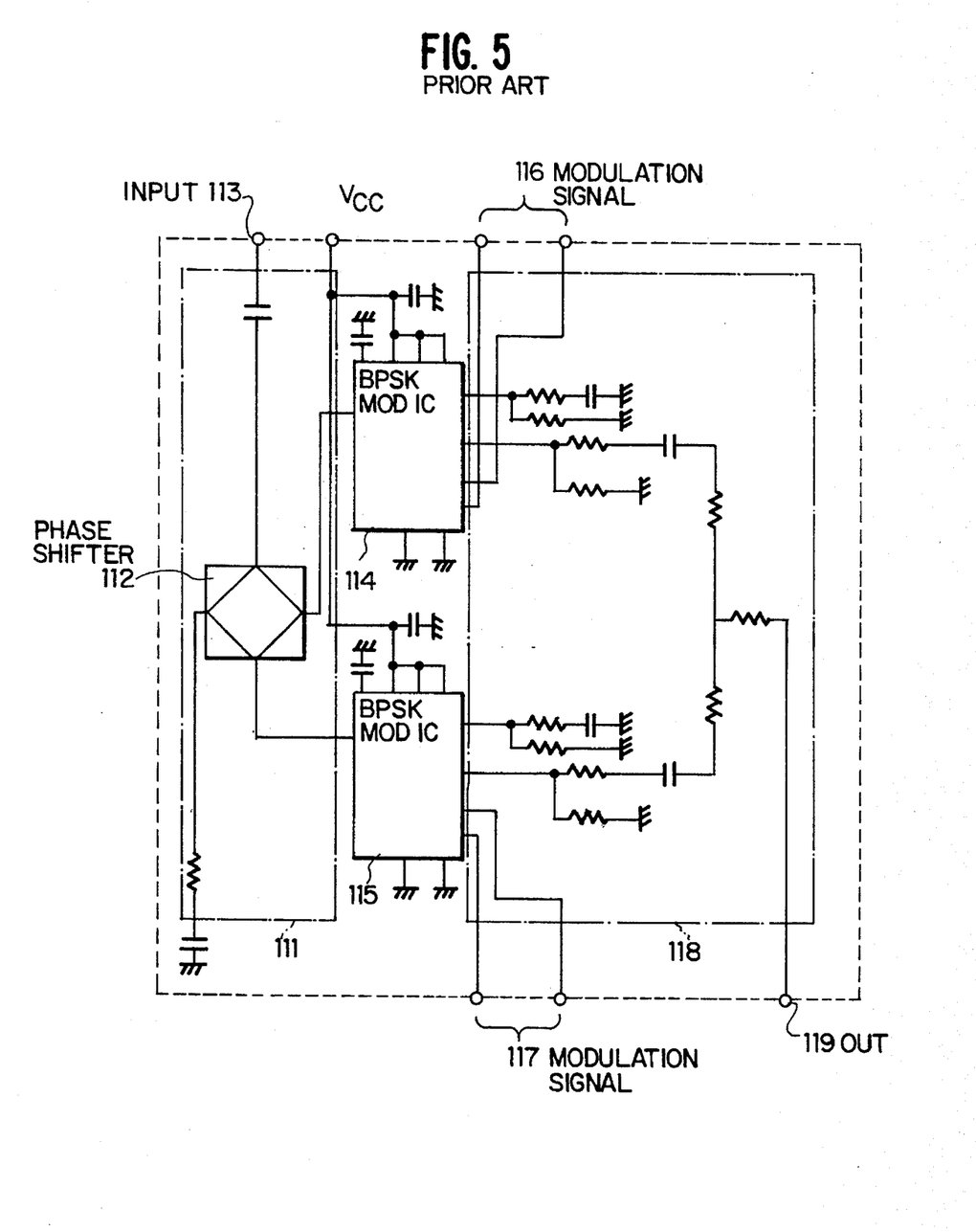
FIG. 5 schematically indicates the circuit arrangement of another conventional quadrature modulator equipped with the 90-degree phase shifter constructed of the passive circuit.

Further, another conventional quadrature modulator is known from Japanese Electronic Information Communication Institute, Spring Conference C-80 in 1993, in which the 90-degree phase shifter operable in the quasi-microwave band is constructed of the passive circuit operable under no power consumption, as represented in FIG. 5. In this prior art quadrature modulator, inter digital type 90-degree phase shifter 112 is employed on the substrate 111. The carrier signal inputted via terminal 113 is converted by the 90-degree phase shifter 112 into the first carrier signal and the second carrier signal having the different phase from that of the first carrier signal by 90 degrees. The first and second carrier signals are supplied to two-phase modulators 114 and 115, which are manufactured as the integrated circuit, and are modulated by the modulation signals derived from terminals 116 and 117. The signals outputted from the 2-phase modulators 114 and 115 are processed in the combiner formed on substrate 118 and the processed signals are outputted from output terminal 119 as the QPSK (quadrature phase shift keying) modulated signal.

In this conventional quadrature modulator, the inter digital type 90-degree phase shifter 112 is formed on the alumina ceramics substrate 111 as the thin film circuit, and both of this alumina ceramics substrate 111 and the substrate 118 are assembled with the two-phase modulators 114 and 115 into a single package, so that this quadrature modulator is operable over such a wide frequency band of 1.5 GHz under less power consumption.

Figure 6:
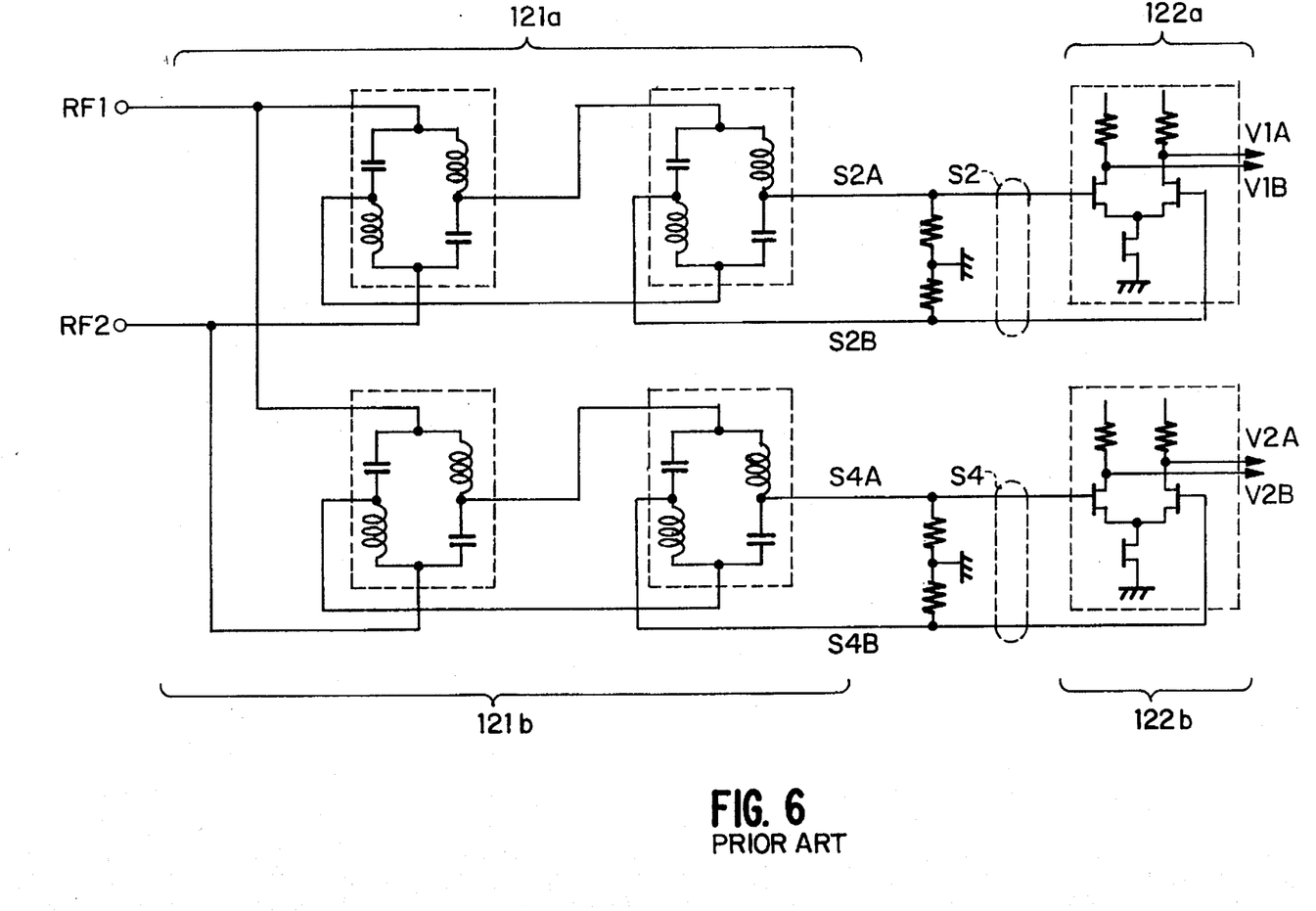
FIG. 6 is a schematic circuit diagram of the phase shifter constructed of the passive element employed in another conventional quadrature modulator.

In addition, a further quadrature modulator operable in the quasi-microwave band is known from japanese Patent Disclosure No. 5-347529 opened on Dec. 27, 1993, in which the phase shifter is arranged by the passive element. FIG. 6 is a circuit diagram for showing one example of the phase shifter employed in this conventional quadrature modulator. In this drawing, the 90-degree phase shifter is so arranged that the first phase shifter constructed by cascade-connecting first phase shifting unit 121a and first differential amplifier circuit 122a is connected in parallel to the second phase shifter constructed by cascade-connecting second phase shifting unit 121b and second differential amplifier circuit 122b with respect to the input.

Each of these phase shifting units 121a and 121b is constructed of the series circuit between the two 4-terminal phase shifters. These phase shifters are formed on the semiconductor substrate from the spiral coil functioning as the phase leading element and the MIM (Metal Insulator Metal) capacitor functioning as the phase delaying element. The high frequency input signals RF1 and RF2 having the phases opposite to each other are inputted via the input terminal to these phase shifting units 121a and 121b, and then are phase-shifted by the phase shifting units to produce two sorts of signals S2A, S2B and S4A, S4B which are represented by quadrature vectors. It should be noted in this case that the phase shifting amounts of the phase shifting units 121a and 121b are set in such a manner that combined vector S2 between the signals S2A and S2B is substantially perpendicular to combined vector S4 between the signals S4A and S4B.

The above-described signals S2A, S2B, and S4A, S4B are entered into the gates of the differential-paired transistors in the differential amplifiers 122a and 122b provided at the next stage, and are differentially amplified by these differential amplifiers, whereby the resulting amplified signals are outputted as signals V1A, V1B and V2A, V2B from the in-phase output terminal and the inverse output terminal, respectively. It should be understood that the phase of the output signal V1A is different from that of the output signal V2A by 90 degrees, whereas the phase of the output signal V1B is different from that of the output signal V2B by 90 degrees.

Figure 7:
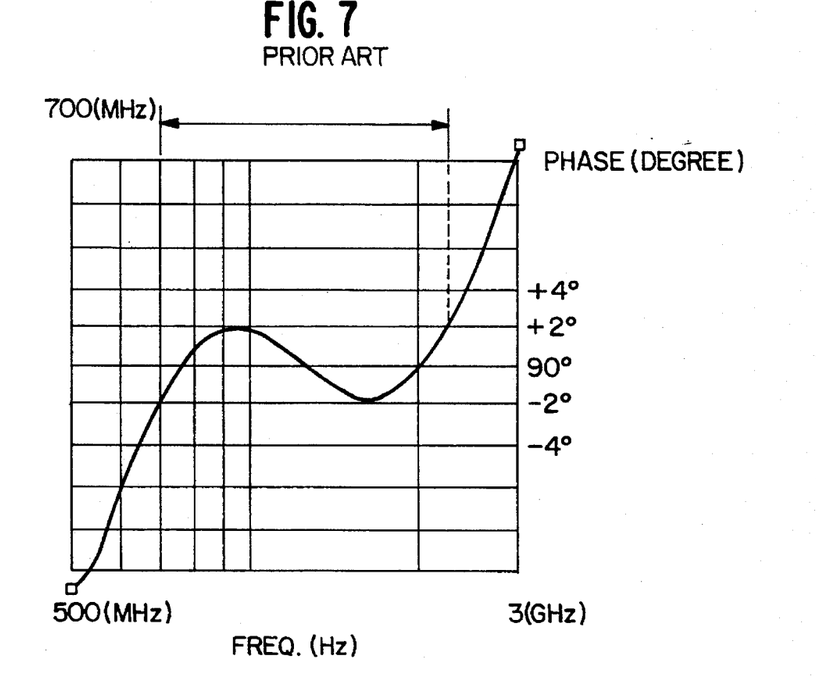
FIG. 7 graphically shows the phase-to-frequency characteristic diagram of the phase shifter shown in FIG. 6.

Accordingly to this conventional phase shifter, as indicated in FIG. 7, the signals V1A (V1B) and V2A (V2B) whose phases could be shifted in precision of (90°−2°) to (90°+2°) can be produced with respect to the high frequency input signals RF1, RF2 in the frequency range from 700 MHz to 2 GHz.

As to the above-described conventional quadrature modulator of FIG. 1, after the input signals (local oscillator signals) are modulated by the low frequency signal, the modulated signals are frequency-converted into the quasi-microwave signals in the mixer 70. As a result, there are drawbacks that two sorts of signal sources LO1 and LO2 are required, the complex circuit arrangement is needed, and spurious noise is produced.

As to another conventional quadrature modulator shown in FIG. 2, although only one signal source LO is required, the 90-degree phase shifter manufactured by the bipolar transistor in the semiconductor integrated circuit could not be practically operated with the carrier frequencies higher than 1 GHz even when this 90-degree phase shifter is realized by the circuit arrangement 80 shown in FIG. 2, or other circuit arrangements. Namely, this quadrature modulator cannot be used in the quasi-microwave band. To the contrary, even when this quadrature modulator is operable in such a quasi-microwave band, since active circuit elements are employed, there is another problem that this conventional quadrature modulator would consume high power.

Also, in the conventional quadrature modulator indicated in FIG. 3, since the 90-degree phase shifter 91 utilizes the filter circuit constructed of the resistor and the capacitor, such amplifier 92 whose output level becomes constant is required to correct unbalance in the output levels. Therefore, there is another problem that the power consumption is increased. A further problem exists in that since the field-effect transistor of the compound semiconductor is more expensive than the silicon bipolar transistor, the overall cost of this quadrature modulator would be increased.

Then, another conventional quadrature modulator represented in FIG. 4 employs such a method for improving the phase shifting precision of 90 degrees in such a manner that the phase shifter is constructed of the variable phase shifter 105, and the phase error detected by the phase comparator 106 is fed back to the variable phase shifter 105. However, there is no concrete description about the operation frequency of the variable phase shifter 105 in Japanese Patent Disclosure No. 2-174343, and thus this conventional quadrature modulator cannot be used in the quad-microwave band.

On the other hand, although the power consumption of the conventional quadrature modulator is low, high manufacturing precision is required for the pattern of the thin film circuit used to constitute the inter digital type 90-degree phase shifter 112 on the substrate 111. Accordingly, there are such drawbacks that this quadrature modulator becomes high cost, and such a cumbersome bonding work is required to connect the very narrow patterns to each other by employing such a fine wire as a gold wire. Moreover, there are other drawbacks. That is, since the semiconductor integrated circuit chips of the substrates 111, 118 and the two-phase modulators 114, 115 are connected to the package by the adhesive soldering material, very cumbersome works are needed. In addition, the cost and volume of this quadrature modulator would be increased.

Furthermore, when the phase shifter of the conventional quadrature modulator represent in FIG. 6 is manufactured on the semiconductor integrated circuit, it is difficult to employ such a manner to construct the spiral coil with a desirable constant. Therefore, as a so-called "cut and try" method is necessarily required to manufacture the desirable spiral coil, there is another drawback that a lengthy designing process is needed. Also, since large fluctuation is made in the constants of the spiral coil and the MIM type capacitor due to the integrated circuit itself, the resulting 90-degree phase difference is greatly fluctuated. Moreover, when such a spiral coil having the constant of several hundreds nH is constructed, a large area is required, which may cause problems that the overall volume of this quadrature modulator is increased and the high cost thereof is needed.

Additionally, as apparent from the characteristic shown in FIG. 7, the phase shifter of the conventional quadrature modulator owns errors with +2° to −2° in the frequency range from 700 MHz to 2 GHz. Taking account of the fluctuation, the entire-errors would be further increased. Further, such a band width of 1.3 GHz where a desired phase shift could be achieved would be an insufficient band width in view of various usage in the quasi-microwave band.

BRIEF SUMMARY OF THE INVENTION

The present invention has been made to solve the above-described various problems, and therefore, has an object to provide a quadrature modulator capable of reducing wrapping around of an input signal into an output terminal, in which an input level is lower over a wide frequency bandwidth of such a high frequency band as a quasi-microwave band.

Another object of the present invention is to provide a compact quadrature modulator manufactured at low cost.

SUMMARY OF THE INVENTION

To achieve the above-described object, a quadrature modulator for modulating a phase signal in a high frequency band, according to one aspect of the present invention, comprises:

- a multi-layer substrate for constituting a 90-degree phase shifter at an inner layer of said multi-layer substrate, said 90-degree phase shifter subdividing an input carrier signal into a first carrier signal and a second carrier signal having a phase different form that of said first carrier signal by 90 degrees by a distributed coupling circuit;
- a semiconductor integrated circuit containing therein two sets of 2-phase modulating circuit units and connected via a wiring line to said multi-layer substrate, said 2-phase modulating circuit units modulating said first carrier signal and said second carrier signal, derived from said 90-degree phase shifter, based on an externally inputted modulating signal, thereby outputting quadrature-modulated signals; and
- protection means for protecting said semiconductor integrated circuit and said wiring line for protection purposes.

The quadrature modulator of the present invention can be made compact by arranging the above-described multi-layer substrate which includes at least:

- a first substrate located at an uppermost layer of said multi-layer substrate and having a region on which said semiconductor integrated circuit is mounted and fixed, a wiring pattern for connecting a pad of said semiconductor integrated circuit via a wiring line to a terminal of said 90-degree phase shifter being formed on said first substrate;
- a plurality of second substrates located at an intermediate layer of said multi-layer substrate and connected to different input terminals for the carrier signals, said distributed coupling circuit being constituted by the wiring patterns formed between the upper second substrate and the lower second substrate; and
- a third substrate located at a lowermost layer of said multi-layer substrate, for forming a ground plane.

The quadrature modulator of the present invention can be manufactured at low cost by arranging the above-described multi-layer substrate which includes at least:

- a first substrate located at an upper layer of said multi-layer substrate and having at least a first wiring pattern for connecting a pad of said semiconductor integrated circuit via a wiring line to a terminal of said 90-degree phase shifter, a region on which said semiconductor integrated circuit is mounted and fixed, and a second wiring pattern whose one ends are connected to different input terminals for the carrier signals, for constituting a side coupling type of said distributed coupling circuit; and
- a second substrate located at a lower layer of said multi-layer substrate, for constituting a ground plane.

According to the present invention, since the 90-degree phase shifter is constructed of the multi-layer substrate and the semiconductor integrated modulator circuit containing the 2-phase modulating circuit unit is mounted on this multi-layer substrate, the overall quadrature modulator can be formed within the same area as the multi-layer substrate. Also, since the 90-degree phase shifter is arranged by the distributed coupling circuit by the multilayer substrate, both of the phase error and the difference between the passing loss and the coupling loss of the 90-degree phase shifter can be lowered over the wide high frequency band.

BRIEF DESCRIPTION OF THE DRAWINGS

The above-described objects and other objects, features, and also advantages of the present invention will become more apparent by reference to the following detailed description of the present invention taken in conjunction with the accompanying drawings, wherein.

DETAILED DESCRIPTION OF THE PREFERRED EMBODIMENTS

A detailed description will now be made of quadrature modulators according to various preferred embodiments of the present invention.

Figure 8:
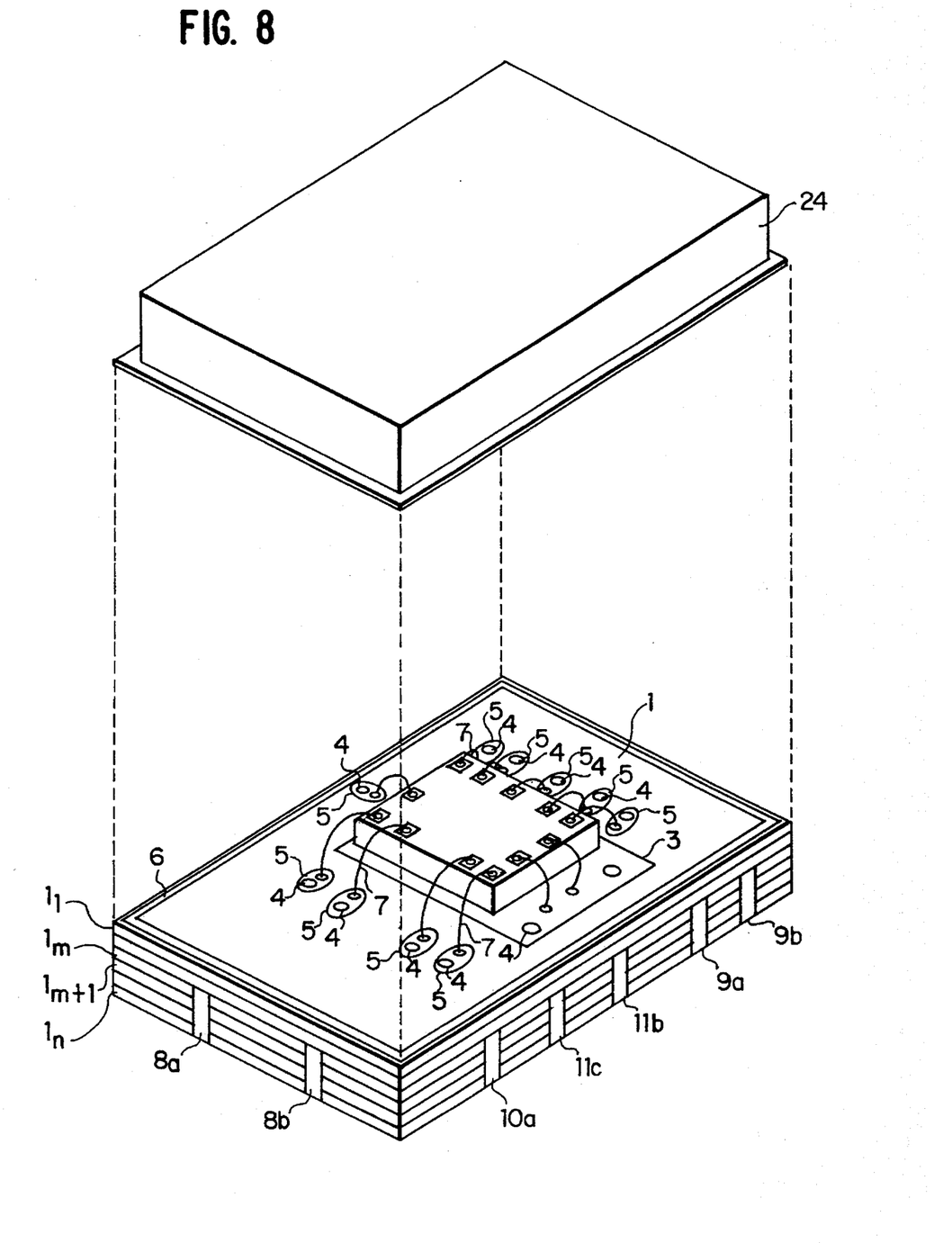
FIG. 8 is a perspective view for showing a quadrature modulator according to a first embodiment of the present invention.

FIG. 8 is a perspective view for showing a quadrature modulator according to a first embodiment of the present invention. FIGS. 9 to 12 are plan views for representing various layers of the substrate shown in FIG. 8.

As schematically indicated in FIG. 8, the quadrature modulator according to this embodiment is mainly arranged by a multi-layer substrate 1 into which a 90-degree phase shifter is assembled, a semiconductor integrated modulator circuit 2 into which two sets of 2-phase modulators and an output signal synthesizing circuit are assembled, and a lid 24.

The multi-layer substrate 1 is constructed of n layers of substrates, i.e., from a first layer (uppermost layer) of substrate $1_1$ to an n-th layer (lowermost layer) of substrate $1_n$. A wiring plane is constructed of an (n−1)th layer. A surface layer formed on the first layer of substrate $1_1$ corresponds to either a layer for assembling a semiconductor integrated circuit, or a layer for connecting the substrate with the semiconductor integrated circuit. As represented in the plan view of FIG. 9, there are formed in the first layer of substrate $1_1$, a rectangular wiring pattern 3, each of island-shaped wiring patterns 5 formed around this rectangular wiring pattern 3, and a pattern 6 having a narrow-width and formed along the peripheral portion of this substrate, which may seal a lid 24. Furthermore, via holes 4 are formed at a predetermined position of the wiring pattern 3 and the wiring pattern 5 in order to be electrically connected to the under layer of substrate.

Figure 9:
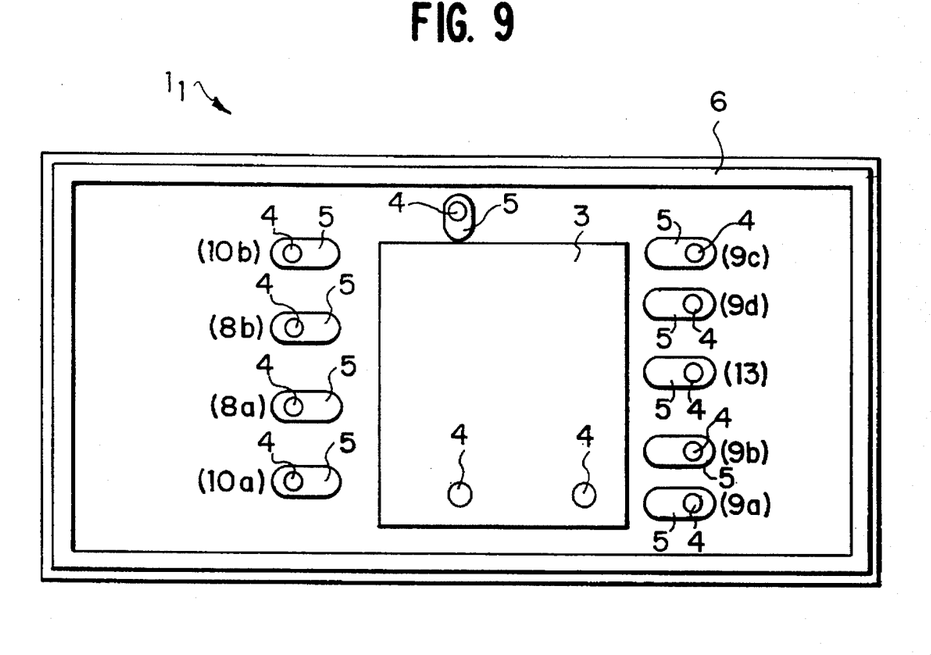
FIG. 9 is a plan view of the first layer of the substrate employed in the quadrature modulator shown in FIG. 8.

As a result, a semiconductor integrated circuit 2 is mounted and fixed on the wiring pattern 3 of the first layer's substrate $1_1$, and a terminal pad of the semiconductor integrated circuit 2 is connected to the corresponding wiring pattern 3 or 5 by way of a bonding wire (wiring line) 7 such as gold (see FIG. 8).

To a side portion and a bottom portion of the multi-layer substrate 1, carrier signal input terminals 8a and 8b, four input terminals 9a to 9d for modulation signals (only two input terminals 9a and 9b being illustrated in FIG. 8), two high frequency ground terminals 10a and 10b (only one ground terminal 10a being illustrated in FIG. 8), are formed as the wiring pattern forms. Further, five ground terminals 11a to 11e (only two ground terminals 11b and 11c being represented in FIG. 8), a power supply terminal 12 (not shown in FIG. 8), and an output terminal 13 are formed in the wiring patterns on the side portion and the bottom portion of this multi-layer's substrate.

It should be noted that reference numerals of the above-described respective terminals are indicated within parentheses, which are connected through the via holes 4 to the wiring pattern 5 on the plan view of the first layer shown in FIG. 9. Also, the ground terminals 11a to 11e are connected through the via holes 4 in the wiring pattern 3.

Figure 10:
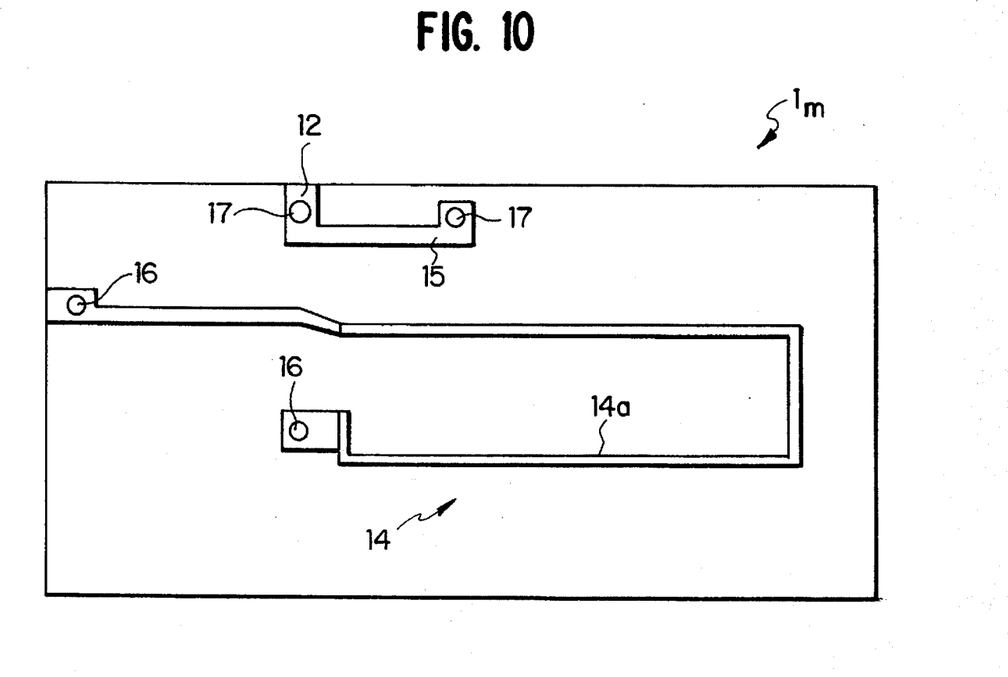
FIG. 10 is a plan view of the m-th layer of the substrate employed in the quadrature modulator shown in FIG. 8.

As indicated in the plan view of FIG. 10, both of a substantially U-shaped wiring pattern 14 one end of which is connected to the above-explained carrier signal input terminal 8a, and another wiring pattern 15 one end of which is connected to the above-described power supply terminal 12 are formed in the m-th layer on the m-th substrate $1_m$ corresponding to the intermediate layer of the multi-layer substrate 1. Also, via holes 16 are formed in both ends of the wiring pattern 14, and via holes 17 are formed in both ends of the wiring pattern 15.

Figure 11:
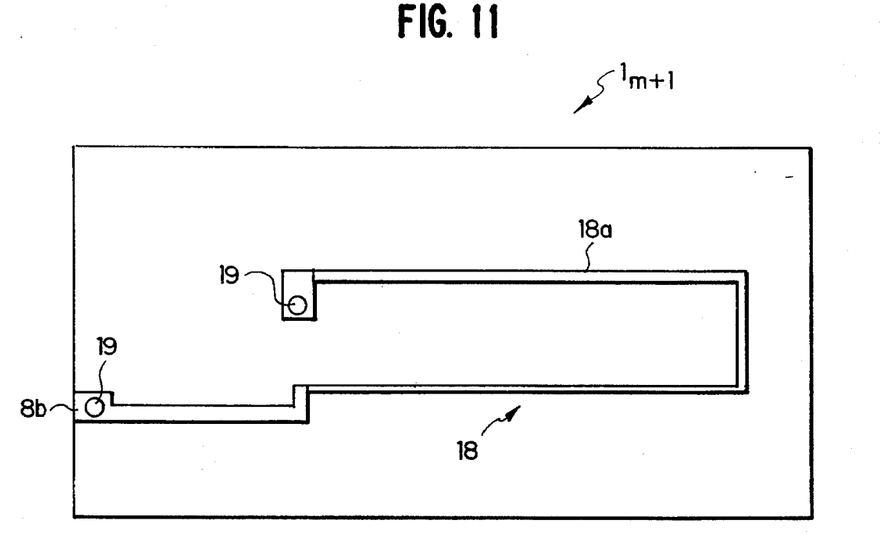
FIG. 11 is a plan view of the (m+1)th layer of the substrate employed in the quadrature modulator shown in FIG. 8.

As shown in the plan view of FIG. 11, a wiring pattern 18 for connecting two via holes to each other, one end of which is connected to the carrier signal input terminal 8b, is connected on an (m+1)th layer of the (m+1)th substrate $1_{m+1}$ of the multi-layer substrate 1. A wiring portion 18a located at a center portion of the substrate of this wiring pattern 18 is formed at a wiring portion 14a located at a center portion of the substrate $1_m$ and a position near the substrate along the vertical direction. These wiring patterns 14a and 18a constitute the 90-degree phase shifter made of distributed coupling circuits with lengths of approximately λg/4. It should be noted that symbol "λg" indicates a wavelength on a signal line, which is determined by a thickness and the dielectric constant of a substrate. Generally speaking, a wavelength of a center frequency in the used frequency range is selected as this wavelength "λg".

Figure 12:
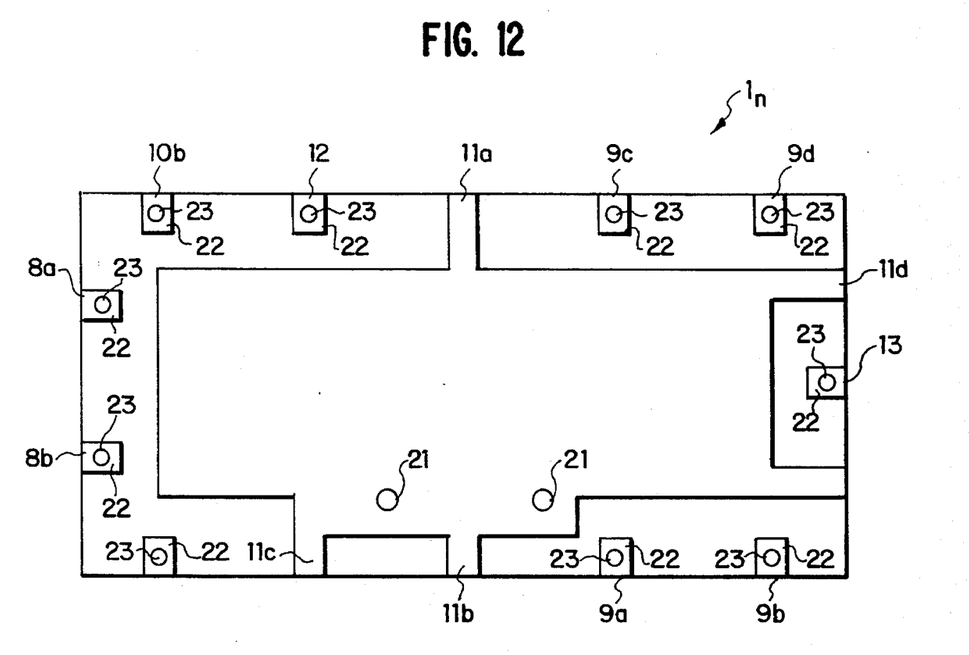
FIG. 12 is a plan view of the (n+1)th layer of the substrate employed in the quadrature modulator shown in FIG. 8.

Furthermore, as shown in the plan view of FIG. 12, a wiring pattern 20 connected to the respective ground terminals 11a to 11e, and a wiring pattern 22 separately connected to the above-described terminals 8a, 8b, 9a to 9d, 10a, 10b, 12, and 13 are provided on an (n+1)th layer of a lower-sided surface of the n-th substrate $1_n$ (namely, lowermost layer) of the multi-layer substrate 1. A via hole 21 used for electrically connecting to the upper layer substrate is fabricated in the wiring pattern 20, whereas a via hole 23 used for electrically connecting to the upper layer substrate is formed in the wiring pattern 22.

The terminals 8a, 8b, 9a to 9d, 10a, 10b, 11a to 11e, 12 and 13 are formed on the multi-layer substrate 1 constructed of the wiring layers 1 to (n+1) of the substrates $1_1$ to $1_n$ with the above-described structures. After the semiconductor integrated circuit 2 has been mounted on the multi-layer substrate 1 and connected thereto, as illustrated in FIG. 8, the lid 24 is provided so as to protect the semiconductor integrated circuit 2 and the bonding wire 7. Alternatively, to protect the semiconductor integrated circuit 2 and the bonding wire 7, a resin material may be coated thereon instead of this lid 24.

Figure 13:
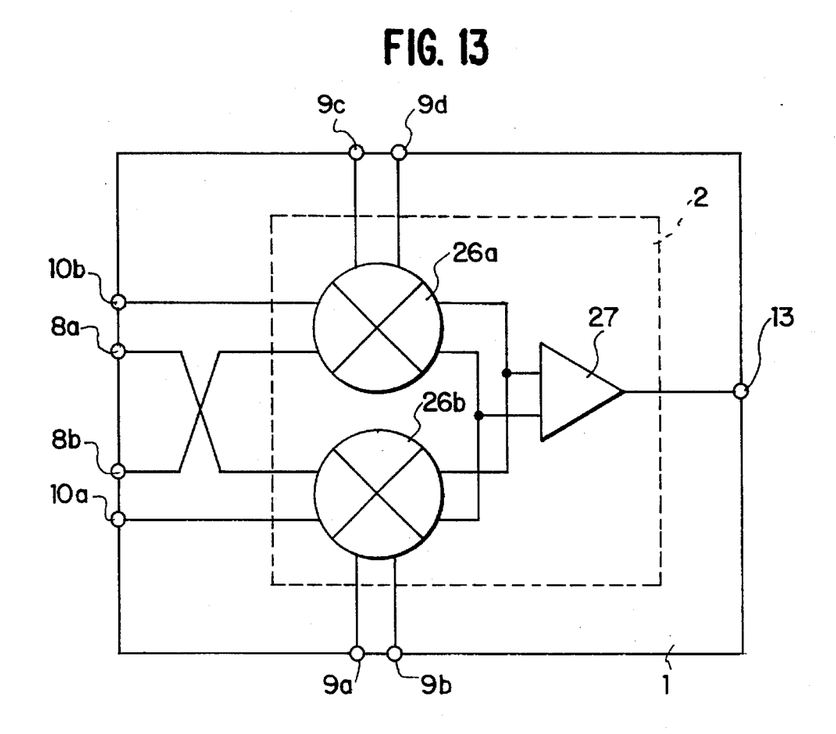
FIG. 13 is a schematic circuit diagram for showing the quadrature modulator of FIG. 8.

A circuit of the quadrature modulator with the above-described structure according to this first embodiment is represented as a circuit diagram of FIG. 13. It should be noted that the same reference numerals shown in FIG. 8 to 12 are employed as those for denoting the same or similar circuit elements in this FIG. 13. In FIG. 13, the semiconductor integrated circuit 2 is arranged by comprising mixers 26a, 26b for constituting a 2-phase modulator, and a synthesizing (combining) circuit 27. In FIG. 13, the power supply terminal 12 and the ground terminals 11a to 11e are omitted.

Next, a description is made of operations of this quadrature modulator with reference to FIG. 13. A carrier signal is entered into one of the input terminals 8a and 8b, and the other input terminal is connected via a terminal resistor and a capacitor to the ground plane, thereby being grounded in view of high frequency circuitry. The carrier signal supplied from the input terminal 8a or 8b is divided by the distributed coupling circuit constructed of the above-described wiring patterns 14 and 18 into two (first and second) carrier signals having different phases from each other by 90 degrees, and thereafter these divided carrier signals are supplied to the mixers 26a and 26b. In the mixer 26a, the first carrier signal inputted is multiplied by first modulation (modulating) signals having phases opposite to each other and furnished from the input terminals 9c and 9d. In the mixer 26b, the second carrier signal having such a different phase from that of the first carrier signal by 90 degrees is multiplied by second modulation (modulating) signals having phases opposite to each other and supplied from the input terminals 9a and 9b. Reference numerals 10a and 10b represents capacitors which are grounded in view of high frequency circuitry.

The synthesizing circuit 27 synthesizes the 2-phase modulation (modulated) signal obtained from the mixers 26a and 26b by way of the multiplication, and the resulting 4-phase modulated signals are outputted from the output terminal 13.

Figure 14:
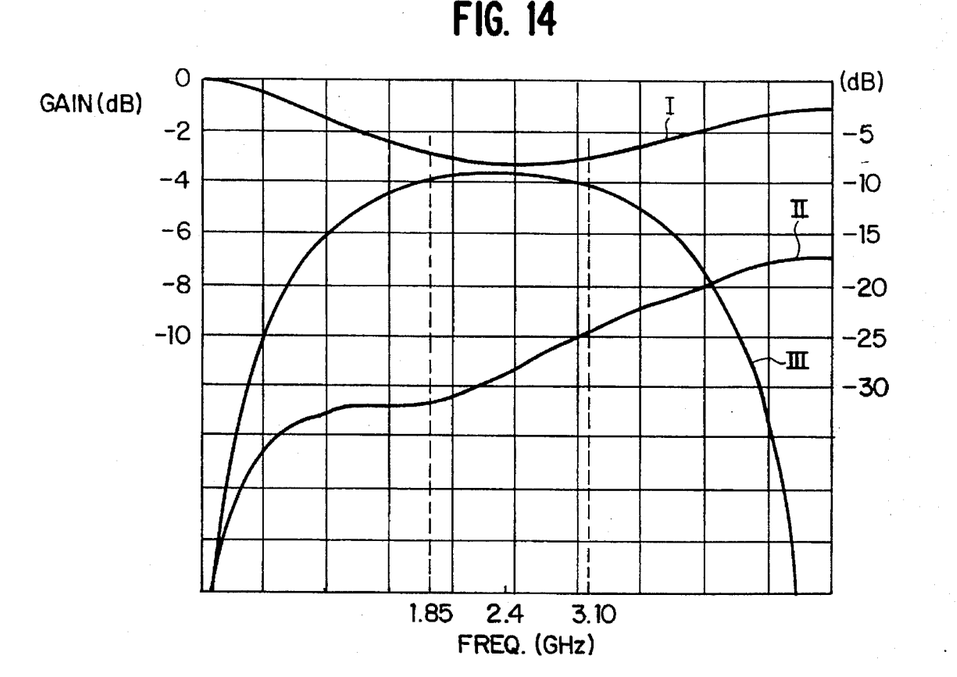
FIG. 14 graphically indicates a characteristic representation between passing loss and coupling loss in the quadrature modulator of FIG. 8.

FIG. 14 is a graphic representation of a characteristic curve between passing loss and coupling loss occurred in the quadrature modulator of this first embodiment. The abscissa of FIG. 14 indicates the frequency, whereas the ordinate thereof represents the gain and isolation. In this graphic representation, a curve "I" shows the gain (passing loss) of the signal transmission path achieved from the carrier signal input terminal 8a (8b) to the input terminal of the mixer 26b (26a), another curve "II" denotes isolation (coupling loss) between both of the input terminals of the mixers 26a and 26b, and also another curve "III" represents a coupling amount of a signal from the input terminal 8a (8b) to the mixer 26a (26b) under such a condition that the center frequency is selected to be 2.4 GHz.

Figure 15:
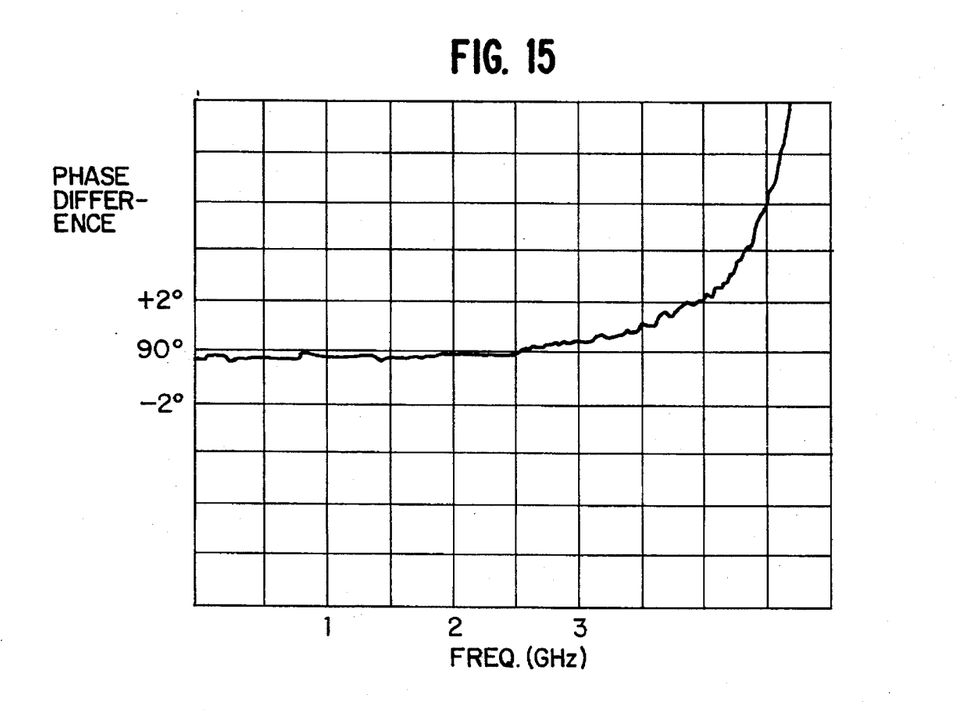
FIG. 15 graphically indicates a characteristic representation among passing output, coupling output, and phase difference in the quadrature modulator of FIG. 8.

On the other hand, FIG. 15 shows another graphic representation in which the ordinate indicates a phase difference between a passing output and a coupling output in this first embodiment. Namely, this ordinate shows such a phase difference between the carrier signals supplied to the input terminals of the mixers 26a and 26b. The abscissa denotes the frequency.

As apparent from the curves I and III shown in FIG. 14, the frequency bandwidth where the difference between the passing loss and the coupling amount is below 1 dB corresponds to 1.25 GHz defined from 1.85 GHz to 3.10 GHz. At this time, an angular shift from 90 degrees in the phase difference between the passing output and the coupling output is smaller than, or equal to 1 degree, as illustrated in FIG. 15. It could be understood from the foregoing description that the above-explained quadrature modulator according to the first embodiment is operable over such a wide frequency range. Furthermore, as obvious from the graphic representation of FIG. 15, the frequency bandwidth where the angular shift from 90 degrees in the above-explained phase difference becomes smaller than, or equal to 2 degrees corresponds to approximately 3 GHz, namely this frequency bandwidth is very broader than that of the conventional quadrature modulator.

It should be noted in this measurement example that as shown in the curve III of FIG. 14, the maximum coupling amount is approximately −3.5 dB, whereas the minimum passing loss amount is about −3 dB as shown in the curve I. When the difference between the maximum coupling amount and the minimum passing loss amount is selected to be 1 dB in order that the maximum coupling amount becomes larger than this difference, such a bandwidth that the difference between the passing loss and the coupling amount is smaller than, or equal to 1 dB becomes wide, so that it is possible to constitute such a 90-degree phase shifter operable over the quasi-microwave band from 1 GHz, in which few input signals are wrapped around the output signal.

In accordance with the first embodiment, as apparent from FIG. 8, since the quadrature modulator is so arranged by assembling the 90-degree phase shifter by employing the multi-layer substrate 1 and also by assembling two sets of 2-phase modulators and the output signal in-phase synthesizing circuit by employing the semiconductor integrated modulator circuit 2, these 90-degree phase shifter, semiconductor integrated modulator circuit chip, and other wiring patterns can be fabricated on the same area. Also, the multi-layer substrate and the package can be incorporated in one body. As a consequence, the more compact quadrature modulator can be manufactured at low cost and operable under low power consumption, as compared with the conventional quadrature modulator.

Figure 16:
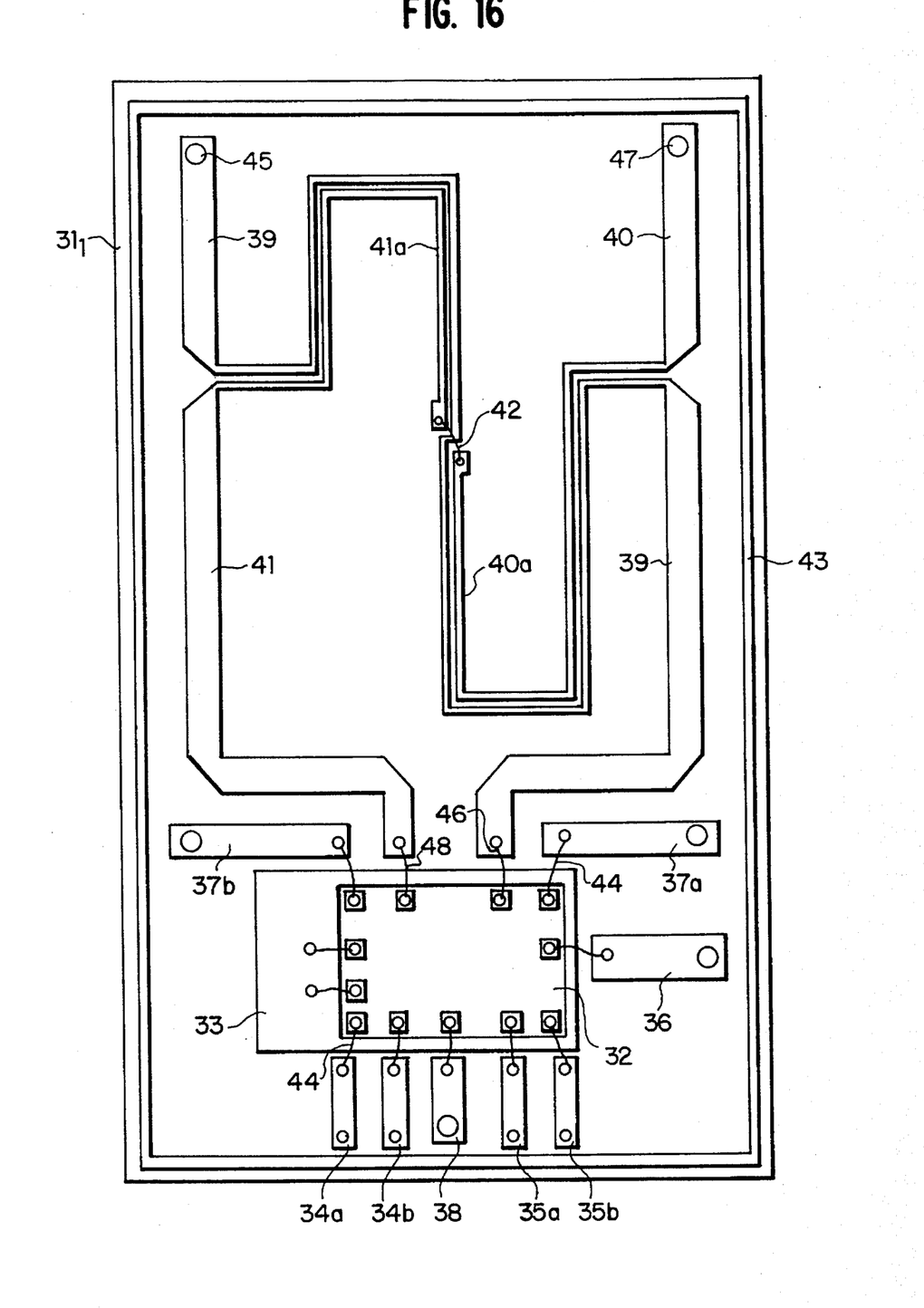
FIG. 16 is a plan view for showing another quadrature modulator according to a second embodiment of the present invention.

Subsequently, a quadrature modulator according to a second embodiment of the present invention will now be described. In FIG. 16, there is shown as a plan view the quadrature modulator of the second embodiment. In accordance with this second embodiment, a 90-degree phase shifter is constructed of a two-layer substrate, and since the second layer constitutes the ground plane, a wiring pattern is formed only on the first layer. FIG. 16 represents the wiring pattern formed on this first layer. In other words, there are fabricated on a first substrate $31_1$, a semiconductor integrated modulator circuit 32 for assembling therein two sets of 2-phase modulators and the output signal in-phase synthesizing (combining) circuit, a rectangular wiring pattern 33, and island-shaped wiring patterns 34a to 38 formed around this rectangular wiring pattern 33 in a separate form. Furthermore, wiring patterns 39 to 41 and a region 43 having a narrow width and formed along the peripheral edge of this first substrate $31_1$ are formed on the first substrate $31_1$.

As illustrated in FIG. 16, the semiconductor integrated circuit 32 is mounted and fixed on the wiring pattern 33, and the wiring patterns 34a to 38 corresponding to the terminal pads of the semiconductor integrated circuit 32 are connected by a bonding wire 44 such as gold. It should be noted in this second embodiment that the wiring patterns 34a and 34b are wiring patterns to be connected to an input terminal of a first modulation signal, and the wiring patterns 35a and 35b correspond to wiring patterns to be connected to an input terminal of a second modulation signal. Furthermore, the wiring pattern 36 is a wiring pattern to be connected to a power supply terminal, the wiring patterns 37a and 37b correspond to wiring patterns to be connected to a high frequency ground terminal, and also the wiring pattern 38 is a wiring pattern to be connected to an output terminal. Then, as indicated by black solid circles of FIG. 16, via holes are formed in the edge portions of these wiring patterns on the substrate side.

Another wiring pattern 39 one end of which is connected through a via hole 45 to an input terminal of a first carrier signal and the other end of which is connected via a bonding wire 46 to a preselected terminal pad of the semiconductor integrated modulator owns a narrow center portion and is formed in a zigzag form. On the other hand, another wiring pattern 40 has one end connected through a via hole 47 to an input terminal of a second carrier signal, and the other end located at a center portion of the substrate as well as a narrow width indicated by reference numeral 40*a*. One end of a wiring pattern 41 has a narrow width and also is located at a center portion of the substrate (indicated by reference numeral 41*a*), whereas the other end of this wiring pattern 41 has a wide width, and is connected via a bonding wire 48 to a predetermined terminal pad of the semiconductor integrated modulator circuit 32.

The end portions 40*a* and 41*a* of the wiring patterns located at the above-described center portion of the substrate are connected via the bonding wire 42 to each other. Moreover, both of the wiring pattern 40 and the wiring pattern 41 are separately positioned adjacent to a portion of the wiring pattern 39. As a consequence, these wiring patterns 39, 40, and 41 constitute the 90-degree phase shifter by the side coupling type distributed coupling circuit.

Similarly, in this second quadrature modulator, one of the input terminal for the first carrier signal and the input terminal for the second carrier signal is grounded by way of the terminal resistor and the capacitor in view of the high frequency circuitry, and the carrier signal entered from the other input terminal is subdivided into two sorts of carrier signals having the different phases from each other by 90 degrees by the 90-degree phase shifter constructed of the above-described distributed coupling circuit. Thereafter, these subdivided carrier signals are supplied to the semiconductor integrated modulator circuit 32 so as to be modulated. Finally, the modulated carrier signals are outputted via the wiring pattern 38 to the output terminal as the quadrature modulated signals.

For the sake of convenience, although not shown in FIG. 16, the surface of the first layer's substrate 31$_1$ may be covered with a lid, or may be coated by a resin material in order to protect the semiconductor integrated modulator circuit 32, the various wiring patterns, and the wires, similar to the first embodiment.

According to the second embodiment, since only one layer is available to form the wiring patterns thereon, the quadrature modulator of this second embodiment inherently own such a demerit about compactness. However, since the pattern surfaces of a single substrate are only two, namely the front and rear surfaces, the manufacturing cost of the second quadrature modulator can be made lower than that of the first quadrature modulator.

It should be understood that although the above-described quadrature modulators of the first and second embodiments are operable in the quasi-microwave band, these modulators may be utilized in the microwave band. Also, the present invention is not limited to the wiring patterns described in the above-described embodiments, for example, the shapes of the wiring patterns 3 and 33 are not limited to the above-described rectangular patterns. Moreover, since the wiring pattern 14 having the length of $\lambda g/4$ is tried to be stored into such a small area, the shape of this wiring pattern 14 merely has the substantially U-shape as previously described. Alternatively, when a larger area is available to store therein the wiring pattern, the shape of this wiring pattern is made straight because such a straight wiring pattern can achieve better characteristics than in the U-shaped pattern. This idea may be similarly applied to the shape of the wiring pattern 39.

As previously described in detail, according to the quadrature modulator of the present invention, the 90-degree phase shifter by the multi-layer substrate is arranged by employing such a distributed coupling circuit with the small phase error and the small difference between the passing loss of the 90-degree phase shifter and the coupling amount thereof. As a consequence, it is possible to realize such a quadrature modulator that the input level is low in the high frequency band such as the quasi-microwave band as well as over the wide range, and furthermore few input signals are wrapped around-the output terminal.

Moreover, according to the present invention, the semiconductor integrated modulator circuit containing the quadrature modulator circuit unit is mounted on the multi-layer substrate for constructing the 90-degree phase shifter, so that the entire quadrature modulator is fabricated within the same area as the multi-layer substrate. Accordingly, the compact quadrature modulator can be manufactured at low cost and operated under lower power consumption.

What is claimed is:

1. A quadrature modulator for modulating a phase signal in a quasi-microwave and microwave band, comprising:

a multi-layer substrate for constituting a 90-degree phase shifter using two wiring patterns at an inner layer of said multi-layer substrate and mounting and fixing a semiconductor integrated modulator circuit chip on said multi-layer substrate, said two wiring patterns connecting an input carrier signal to said semiconductor integrated modulator circuit chip and subdividing said input carrier signal into a first carrier signal and a second carrier signal having a phase different from that of said first carrier signal by 90 degrees by a distributed coupling circuit;

said semiconductor integrated modulator circuit chip containing therein two sets of 2-phase modulating circuit units and connected via a wiring line to said multi-layer substrate, said 2-phase modulating circuit units modulating said first carrier signal and said second carrier signal, derived from said 90-degree phase shifter, based on an externally inputted modulating signal, thereby outputting quadrature-modulated signals; and protection means for protecting said semiconductor integrated modulator circuit chip and said wiring line for protection purposes.

2. The quadrature modulator as claimed in claim 1 wherein:

said multi-layer substrate includes at least:

a first substrate located at an uppermost layer of said multi-layer substrate and having a region on which said semiconductor integrated modulator circuit chip is mounted and fixed, a wiring pattern for connecting a pad of said semiconductor integrated modulator circuit chip via a wiring line to a terminal of said 90-degree phase shifter being formed on said first substrate;

a plurality of second substrates located at an intermediate layer of said multi-layer substrate and connected to different input terminals for the carrier signals, said distributed coupling circuit being constituted by the wiring patterns formed between the upper second substrate and the lower second substrate; and a third substrate located at a lowermost layer of said multi-layer substrate, for forming a ground plane.

3. The quadrature modulator as claimed in claim 1 wherein:

said multi-layer substrate includes at least:

a first substrate located at an upper layer of said multi-layer substrate, wherein a first wiring pattern of said two wiring patterns connects a pad of said semiconductor integrated modulator circuit chip via a wiring line to a terminal of said 90-degree phase shifter, said first substrate having a region on which said semiconductor integrated modulator circuit chip is mounted and fixed, and wherein a second wiring pattern of said two wiring pattern has ends which are connected to different input terminals for the carrier signals, for constituting a side coupling type of said distributed coupling circuit; and a second substrate located at a lower layer of said multi-layer substrate, for constituting a ground plane.

4. The quadrature modulator as claimed in claim 3 wherein said first and second wiring patterns own lengths substantially equal to a ¼ wavelength of a central frequency with respect to a frequency band under use.

5. The quadrature modulator as claimed in claim 1 wherein wiring patterns are formed on a side edge portion of said multi-layer substrate, said wiring patterns constitute a carrier signal inputting terminal for entering the carrier signal to said 90-degree phase shifter, a high frequency ground terminal, a terminal for driving said semiconductor integrated circuit, a modulation signal inputting terminal for entering the modulation signal into said semiconductor integrated circuit, and an output terminal for deriving the modulated signals from the synthesizing circuit employed in said semiconductor integrated circuit.

6. The quadrature modulator as claimed in claim 1 wherein said quadrature modulating circuit units employed within said semiconductor integrated circuit is constructed of:

first and second 2-phase modulators for separately modulating said first carrier signal and said second carrier signal, which are derived from said 90-degree phase shifters, based upon said externally inputted modulating signal; and an in-phase synthesizing circuit for synthesizing the output signal from said first 2-phase modulator with the output signal from said second 2-phase modulator under in-phase condition and for externally outputting the synthesized modulation signal.

* * * * *